United States Patent
Brew et al.

(10) Patent No.: US 9,922,057 B2
(45) Date of Patent: Mar. 20, 2018

(54) DYNAMIC CONSTRUCTION OF KNOWLEDGE BASE BY USAGE PATTERN RECOGNITION

(71) Applicant: International Business Machines Corporation, Armonk, NY (US)

(72) Inventors: Anthony T. Brew, Dublin (IE); Nathan Cullen, Cork (IE); Vinh Tuan Thai, Cork (IE); Mark N. Wegman, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 15/018,909

(22) Filed: Feb. 9, 2016

(65) Prior Publication Data
US 2017/0228401 A1    Aug. 10, 2017

(51) Int. Cl.
  *G06F 17/30*     (2006.01)
  *G09B 19/00*     (2006.01)
(52) U.S. Cl.
  CPC .. *G06F 17/30292* (2013.01); *G06F 17/30371* (2013.01); *G09B 19/0053* (2013.01)
(58) Field of Classification Search
  None
  See application file for complete search history.

(56) References Cited

U.S. PATENT DOCUMENTS

| | | | |
|---|---|---|---|
| 6,262,730 B1 * | 7/2001 | Horvitz | G06F 9/4446 715/707 |
| 2007/0136400 A1 | 6/2007 | Ames et al. | |
| 2010/0146483 A1 | 6/2010 | Komarov et al. | |
| 2010/0305991 A1 | 12/2010 | Diao et al. | |
| 2014/0201351 A1 | 7/2014 | Fransen | |

FOREIGN PATENT DOCUMENTS

| | | |
|---|---|---|
| EP | 2369481 A2 | 9/2011 |
| WO | 2008063797 A2 | 5/2008 |
| WO | 2012137083 A1 | 10/2012 |

OTHER PUBLICATIONS

Hermann, Oh, patents! Oh, Clippy! Apr. 30, 2014, Patents on the soles of your shoes . . . , http://patentsonthesolesofyourshoes.blogspot.com/2014/04/oh-patents-oh-clippy.html.*

(Continued)

*Primary Examiner* — Jason Liao
(74) *Attorney, Agent, or Firm* — Stephanie L. Carusillo (57) ABSTRACT

A method, computer program product, and system for constructing a dynamic knowledge base of software usage patterns. A user action is monitored to identify one or more user action sequences. A common action sequence for the user action is identified, based on the one or more user action sequences. An instructional information resource is identified that corresponds to the common action resource, wherein the instructional information resource is accessed by the user. A database is constructed based on the common action sequence. The database organizes the common action sequences and instruction information resource. The instructional information resource is determined to be above a threshold based on the number of times the user consults the instructional information resource.

20 Claims, 3 Drawing Sheets

(56) References Cited

OTHER PUBLICATIONS

O'Reilly et al., Windows 98 in a Nutshell Sep. 5, 1999, O'Reilley Media, $2^{nd}$ ed, p. 289 [Bib data captured by Amazon.com].*
General information about Windows 98 and Windows 98 Second Edition hotfixes Jan. 23, 2007, microsoft.com, https://support.microsoft.com/en-us/kb/206071.*
Hersch, FAQs about FAQs Nov. 17, 1997, faqs.org, http://www.faqs.org/faqs/faqs/about-faqs/.*
Hong et al., "WebQuilt: A Framework for Capturing and Visualizing the Web Experience", Carnegie Mellon University Research Showcase @ CMU, 2001, Group for User Interface Research, Computer Science Division, University of California at Berkeley, Berkeley, CA 94720-1776 USA, 12 pages, <http://repository.cmu.edu/cgi/viewcontent.cgi?article=1060&context=hcii>.
Mah et al., "Funnel Report Mining for the MSN Network", Copyright ACM 2001, pp. 450-455.
Shah, I., "Event Patterns as Indicators of Usability Problems", J. King Saud University, vol. 20, Comp. & Info. Sci., pp. 31-43, Department of Computer Science, College of Computer & Information Sciences, King Saud University, Riyadh Saudi Arabia, Received Mar. 14, 2007; accepted for publication Sep. 4, 2008.
"About the Goal Flow report", Analytics Help, printed on Nov. 6, 2015, 3 pages, <https://support.google.com/analytics/answer/2520139>.
"Sequential pattern mining", From Wikipedia, the free encyclopedia, This page was last modified on Oct. 29, 2015, 2 pages, <https://en.wikipedia.org/wiki/Sequential_pattern_mining>.

* cited by examiner

DYNAMIC CONSTRUCTION OF KNOWLEDGE BASE BY USAGE PATTERN RECOGNITION

BACKGROUND OF THE INVENTION

The present invention relates generally to the field of software usage patterns, and more particularly to a dynamic knowledge base of software usage patterns.

Often, instructional information is produced that explains functions of a software system. In some instances, new instructional information is needed each time the software code is changed. Instructional information can include formal documents, wikis, forums, blog entries, subject matter expert websites, tutorial videos, etc. In many cases, software includes instructional information created by the developer (i.e., official instructional information), which can be accessed through the software system. Often, instructional information may be created by users of the software and not the developers. In some cases, a user seeks out unofficial instructional information (i.e., instructional information created by a user) when the official instructional information is not available or not helpful. In these cases, a user may have to leave the software system to access resources containing the unofficial instructional information.

SUMMARY

According to one embodiment of the present invention, a method for constructing a dynamic knowledge base of software usage patterns is provided. The method includes monitoring, by one or more processors, a user action to identify one or more user action sequences; identifying, by one or more processors, a common action sequence for the user action, based at least in part on the one or more user action sequences; identifying, by one or more processors, an instructional information resource, wherein the instructional information resource corresponds to the common action resource, and wherein the instructional information resource is a resource accessed by the user; and constructing, by one or more processors, a database based on the common action sequence, wherein the database organizes the common action sequences and instructional information resource.

According to another embodiment of the present invention, a computer program product for constructing a dynamic knowledge base of software usage patterns is provided. The computer program product comprises a computer readable storage medium and program instructions stored on the computer readable storage medium. The program instructions include program instructions to monitor a user action to identify one or more user action sequences; program instructions to identify a common action sequence for the user action, based at least in part on the one or more user action sequences; program instructions to identify an instructional information resource, wherein the instructional information resource corresponds to the common action resource, and wherein the instructional information resource is a resource accessed by the user; and program instructions to construct a database based on the common action sequence, wherein the database organizes the common action sequences and instructional information resource.

According to another embodiment of the present invention, a computer system for constructing a dynamic knowledge base of software usage patterns is provided. The computer system includes one or more computer processors, one or more computer readable storage media, and program instructions stored on the computer readable storage media for execution by at least one of the one or more processors. The program instructions include program instructions to program instructions to monitor a user action to identify one or more user action sequences; program instructions to identify a common action sequence for the user action, based at least in part on the one or more user action sequences; program instructions to identify an instructional information resource, wherein the instructional information resource corresponds to the common action resource, and wherein the instructional information resource is a resource accessed by the user; and program instructions to construct a database based on the common action sequence, wherein the database organizes the common action sequences and instructional information resource.

DETAILED DESCRIPTION

An embodiment of the present invention recognizes instructional information provided by developers may not be the most helpful tool to a user. For example, the instructional information provided within the software may not be the most efficient way to complete a user's goal or can become out-of-date. An embodiment of the present invention recognizes that instructional information for many software products can be found through other resources. For example, instructional information can be found in blogs, forums, wikis, tutorial videos, subject matter expert videos, etc. An embodiment of the present invention further recognizes that a user may have to utilize a secondary resource to complete a task within a software system. In some cases, a user leaving the software system to find the instructional information provided by other resources can be timely and inefficient.

An embodiment of the present invention provides a means to create a dynamic database of software usage patterns and associated instructional information resources. An embodiment of the present invention monitors users of a software system to determine instructional information resources used by the user to create a dynamic database. In some embodiments, the instructional information resources are aggregated into a database that is accessible by users from within the software system. An embodiment of the present invention correlates a common action sequence to one or more instructional information resources. The correlation allows the software system to more efficiently direct a user to useful instructional information.

Figure 1:
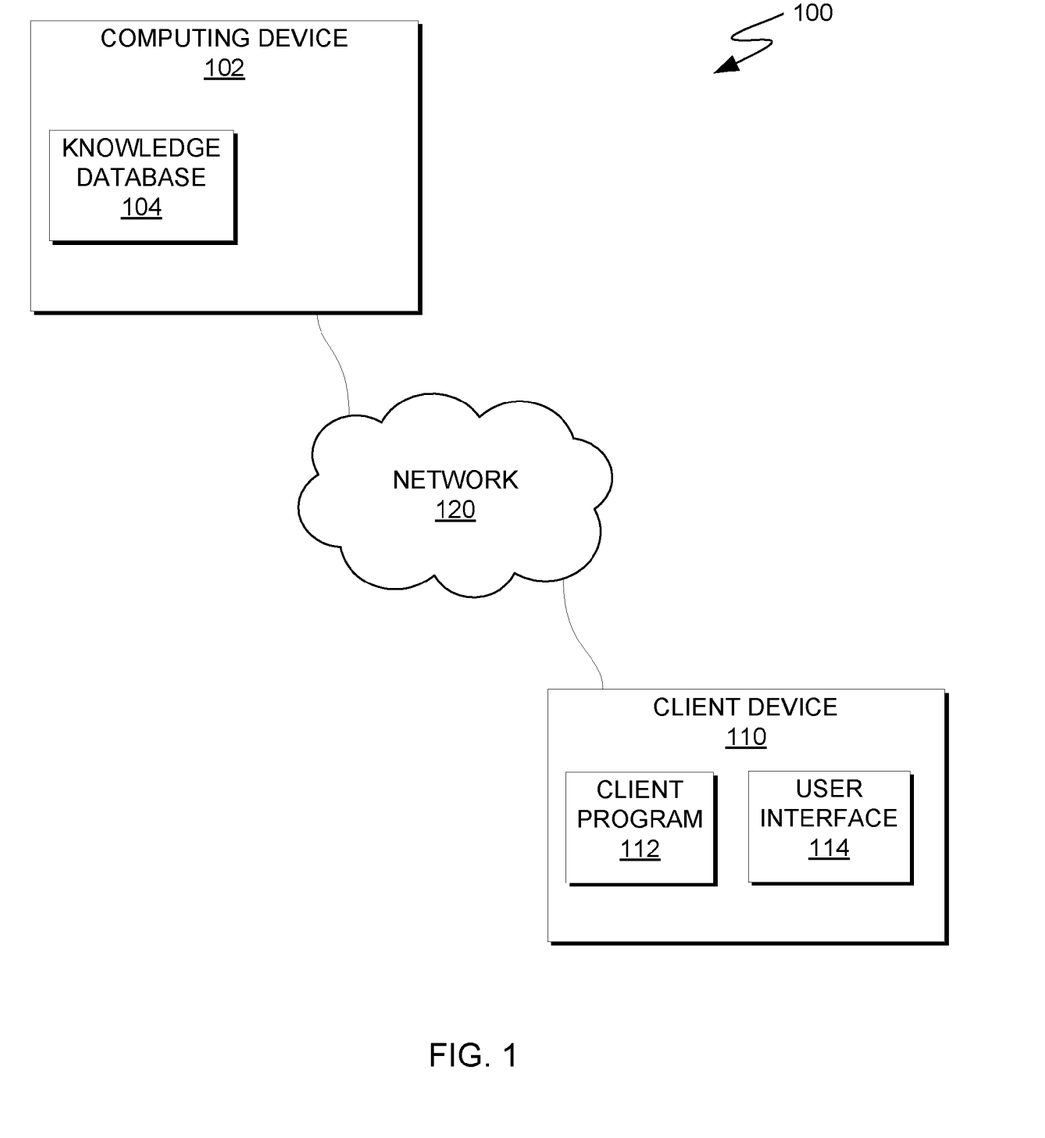
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes knowledge database 104.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to some or all of knowledge database 104 and is capable of accessing or executing client program 112. Computing device 102 may include internal and external hardware components, as depicted and described in further detail with respect to FIG. 3.

In an embodiment of the present invention, knowledge database 104 is stored on computing device 102. In other embodiments, knowledge database 104 may reside on another computing device, provided that knowledge database 104 can is accessible by client program 112. In yet other embodiments, knowledge database 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Knowledge database 104 operates to dynamically receive and store help references related to client program 112. Knowledge database 104 stores common action sequences and related instructional information resources. In some embodiments, the data sets stored to knowledge database 104 assist a user of client program 112 in more efficiently finding instructional information for completing common action sequences. Knowledge database 104 is a data repository that may be written to and read by client program 112. Instructional information references and associated directories may be stored to knowledge database 104. In some embodiments, knowledge database 104 may be written to and read by programs and entities outside of computing environment 100 in order to populate the repository with help references related to client program 112.

In some embodiments, the datasets stored in knowledge database 104 are organized in various subgroups to better assist a user. For example, knowledge database 104 can contain common action sequences for a software system and instructional information resource items consulted by users for each of the common action sequences. In some embodiments, knowledge database 104 also collects various statistics relating to the common action sequences. For example, whether a user required help for a common action sequence, the amount of help required to complete each common action sequence, the instructional information that provided the least/most efficient assistance in completing the common action sequence, and common action sequences that required the user to leave the software system for assistance. In some embodiments, knowledge database 104 collects various statistics on the instructional information. For example, the common action sequences that are associated with each instructional information resource, the number or percentage of users that needed instructional information to complete a common action sequence, the number or percentage of users that needed external instructional information to complete a common action sequence, internal instructional information that was consulted prior to a user seeking external instructional information, and instructional information that has not been consulted by any user for a predefined time.

In various embodiments of the present invention, client device 110 can each respectively be a laptop computer, a tablet computer, a netbook computer, a personal computer (PC), a desktop computer, a personal digital assistant (PDA), a smart phone, or any programmable electronic device capable of communicating with computing device 102 via network 120. Client device 110 includes client program 112, which executes locally on client device 110.

Client program 112 operates to monitor user activity to determine common action sequences within the software system and related instructional information used by the user to complete the common action sequences. Client program 112 can be any software system where a user interacts with the system to complete an action. In some embodiments, client program 112 is part of a software-as-a-service (SaaS) environment. In some embodiments, client program 112 has a help function imbedded in the program. In these embodiments, the help function include instructional information to assist a user in completing common action sequences.

Client device 110 includes user interface (UI) 114 which executes locally on client device 110 and operates to provide a UI to a user of client device 110. User interface 114 further operates to receive user input from a user via the provided user interface, thereby enabling the user to interact with client device 110. In one embodiment, user interface 114 provides a UI that enables a user of client device 110 to interact with client program 112 of computing device 110. In another embodiment, user interface 114 provides a UI that enables a user of client device 110 to interact with knowledge database 104 via network 120. In various examples, the user interacts with client program 112 in order to complete common action sequences. In one embodiment, user interface 114 is stored on client device 110. In other embodiments, user interface 114 is stored on another computing device (e.g., computing device 102), provided that user interface 114 can access and is accessible by at least client program 112.

Figure 2:
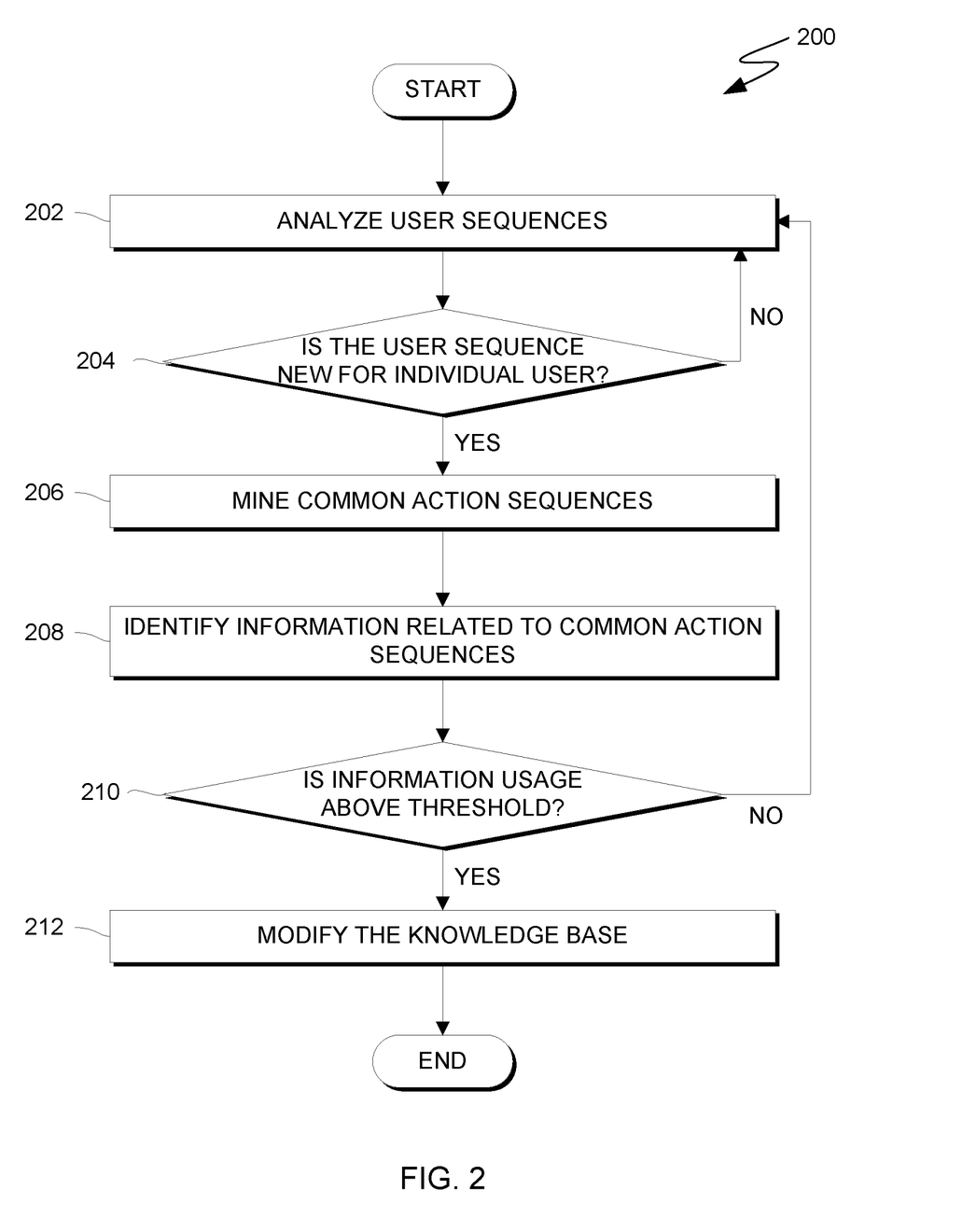
FIG. 2 is a flowchart depicting operations for dynamically constructing a knowledge base, on a computing device within the computing environment of FIG. 1, in accordance with an embodiment of the present invention.

FIG. 2 is a flowchart depicting operations for dynamically creating a knowledge base of help references, on a computing device within the computing environment of FIG. 1, in accordance with an embodiment of the present invention. For example, FIG. 2 is a flowchart depicting operations 200 of client program 112, on client device 110 within computing environment 100.

In step 202, client program 112 analyzes a user sequence. Client program 112 monitors the usage patterns of multiple users. For example, in a SaaS application, client program 112 usage patterns can be established by following an event flow by monitoring several users. In some embodiments, the client program 112 monitors several users over a period of time to analyze the user sequence. For example, a user sequence may be File>Create New>Input Name>Copy>Paste>Save. In some embodiments, each element of a user sequence has a unique ID, such that client program 112 determines navigation between elements based on a string of the unique IDs. Client program 112 identifies and analyzes a user actions in client program 112 for reoccurring user sequences.

In decision 204, client program 112 determines whether the user sequence is new for an individual user. For example, referencing the example user sequence, client program 112 determines whether the individual user being monitored has previously attempted to "Create New." In some embodiments, the determination, by client program 112, that the user sequence is new for an individual user is based on a rule set. For example, a user sequence is determined as new if the individual user has never attempted the user sequence for the software system. In another example, the rule can be temporal. For example, a user sequence is determined as new if the individual user has not attempted the user sequence for a period of time (e.g., the user has not created the user sequence in three months). The temporal rule set allows client program 112 to determine that an instructional information resource was accessed to aid the individual user in completing the user sequence. Additionally, the temporal limit aids client program 112 to determine that the instructional information resource was successful in aiding the individual user in completing the user sequence. If client program 112 determines that the user sequence is new for an individual user (decision 204, YES branch), then client program 112 determines a common action sequence for the user sequence. If client program 112 determines that the user sequence is not new to the individual user (decision 204, NO branch), client program 112 continues to analyze user sequences to new sequences for an individual user.

In step 206, client program 112 determines a common action sequence. Client program 112 determines a common action sequence based on the user sequences. The common action sequence can include all or part of a user sequence. For example, based on the prior example, a common action sequence can be File>Create New>Input Name>Save. In this example, client program 112 determines steps of the user sequence are necessary to complete a desired action. In the user sequence example, Copy>Paste is used as an input method. In other examples, a user can use another method (e.g., keyboard input). Client program 112 stores common action sequences in knowledge database 104. In some embodiments, client program 112 monitors user patterns to determine whether the common action sequence is new to an individual user. In some embodiments, client program 112 monitors user patterns to determine whether the common action sequence is an infrequent action for an individual user. In some embodiments, a determination that a common action sequence is new or infrequent for an individual user causes client program 112 to monitor for user access of instructional information. In some embodiments, client program 112 continuously monitors for user access of instructional information.

Client program 112 writes the identified common action sequence to knowledge database 104. In some embodiments, client program 112 writes user sequences related to each common action sequence to knowledge database 104. In some embodiments, user sequences and common action sequences can be used by client program 112 to identify where an individual user may need help. For example, when a high percentage of user's required help for a common action sequence, client program 112 can recommend instructional information to an individual user the first time a user attempts a common action sequence.

In some embodiments, the common action sequence is mined from the user sequence by running a window across the sequences and finding pairs that more commonly occur together. In some embodiments, this is done be determining statistical strength. For example, Create New>Input Name occurs 100% of the time, but Input Name>Copy only occurs 20% of the time. Where the strength drops below a threshold, it is not part of the common action sequence.

In step 208, client program 112 identifies instructional information related to the common action sequence. In some embodiments, client program 112 monitors user action on simultaneously running programs to determine instructional information resources used by a user. In some embodiments, client program 112 determines a user's access of instructional information provided within the software system. In some embodiments, access to informational resources has a temporal limit. For example, client program 112 determines all instructional information accessed within a pre-determined time (e.g., five minutes) prior to the completion of the common action sequence. In another embodiment, access to informational resources is stipulated to be the instructional information resource accessed immediately prior to the completion of the common action sequence. In some embodiments, the instructional information resources are accessed through client program 112 (e.g., a help menu, an internal network search function, etc.). In other embodiments, the informational resources are accessed through a source outside of client program 112 (e.g., a blog, video content, a forum, etc.). Client program 114 tracks how frequently an instructional information resource is accessed. Client program 114 additionally tracks whether common action sequences require instructional information and whether the user accessed internal or external instructional information.

In determination 210, client program 112 determines whether the identified instructional information is above a usage threshold. To determine whether the accessed information is related to the common action sequence, client program 112 determines whether the accessed information has been previously accessed by other users. In some embodiments, an informational resource must be accessed a minimum number of times. For example, a resource must be accessed by five users before client program 112 determines the identified information is related. In some embodiments, an informational resource must be accessed by a percentage of prior users. For example, a resource must be accessed by ten present of users before client program 112 determines that identified information is related. If client program 112 determines that the instructional information is above the threshold (decision 210, YES branch), then client program 112 modifies knowledge database to include the instructional information. If client program 112 determines that the instructional information is not above the threshold (decision 210, NO branch), client program 112 continues to analyze user sequences to identify new sequences for an individual user.

In step 212, client program 112 modifies knowledge database 104. Client program 112 modifies knowledge base 104 based on identified common action sequences and instructional information. Instructional information is added or deleted based on user actions. For example, if an instructional information resources surpasses the threshold, the resource is added to the knowledge database 104. In another example, if an instructional information resource is not accessed by users for a predetermined amount of time (e.g., a number of days, frequency with respect to other resources related to the same common action sequence), it is deleted from knowledge database 104. For example, after a number, or percentage, of individual users complete a common action sequence for a first time, where help is provided by knowledge database 104 including the instructional information resource, without an individual user accessing the instructional information resource, the resource is deleted from knowledge database 104. In some embodiments, modifying knowledge database 104 includes reorganizing the database. For example, ranking the instructional information resources, such that client program 112 provides an individual user one resource over another. In some embodiments, the ranking is based on the number of times a resource is used compared to other resources. In another embodiment, the ranking is based on user feedback, where a user indicates, via the UI, the usefulness of a resource.

In some embodiments, knowledge database 104 is organized into sections and headings based on help consultation. For example, common action sequences are given headings in a help resource of the software system. In some embodiments, the statistics gathered about the number of instructional information resources used to complete a common action resource allows for a more efficient help function. For example, if a common action resource is always completed without the assistance of instructional information, it can be eliminated from the help section. Whereas, a common action sequence that requires significant use of instructional information can include an in-depth help section. Instructional information resources referenced by users to complete common action resources can be organized under the relevant headings within knowledge database 104. In some embodiments, the instructional information resources are ranked (i.e., prioritized), based on the number of times each resource was used during the completion of a common action sequence. In some embodiments, instructional information resources can be ranked by the efficiency of the help provided. For example, some resources may provide help that allows a user to complete a common action resource in a time frame (e.g., three to five minutes), whereas another help resource allows the user to complete the common action resource in another time frame (e.g., seven to ten minutes). In this example, the resource that allows the user to complete the common action sequence in a shorted time frame is ranked higher.

Knowledge database 104 is dynamic. Knowledge database 104 changes as the needs of users change or as changes are made to client program 112. For example, as functions are added or removed from client program 112, headings and associated common action sequences are added or removed from knowledge database 104. In some embodiments, if instructional information is not consulted for a predefined time, the resource can be removed from knowledge database 104. Similarly, if the source of instructional information changes, the resource in knowledge database 104 can be modified to reflect the change. For example, users may start using tutorial videos more frequently than blogs. In this example, the blog resource is replaced with the tutorial video in knowledge database 104. In some embodiments, the ranking of a resource changes as user preference in instruction information resources change. Using the previous example, instead of replacing the blog with the tutorial video, both resources remain in knowledge database 104, but the tutorial video receives a higher ranking.

Figure 3:
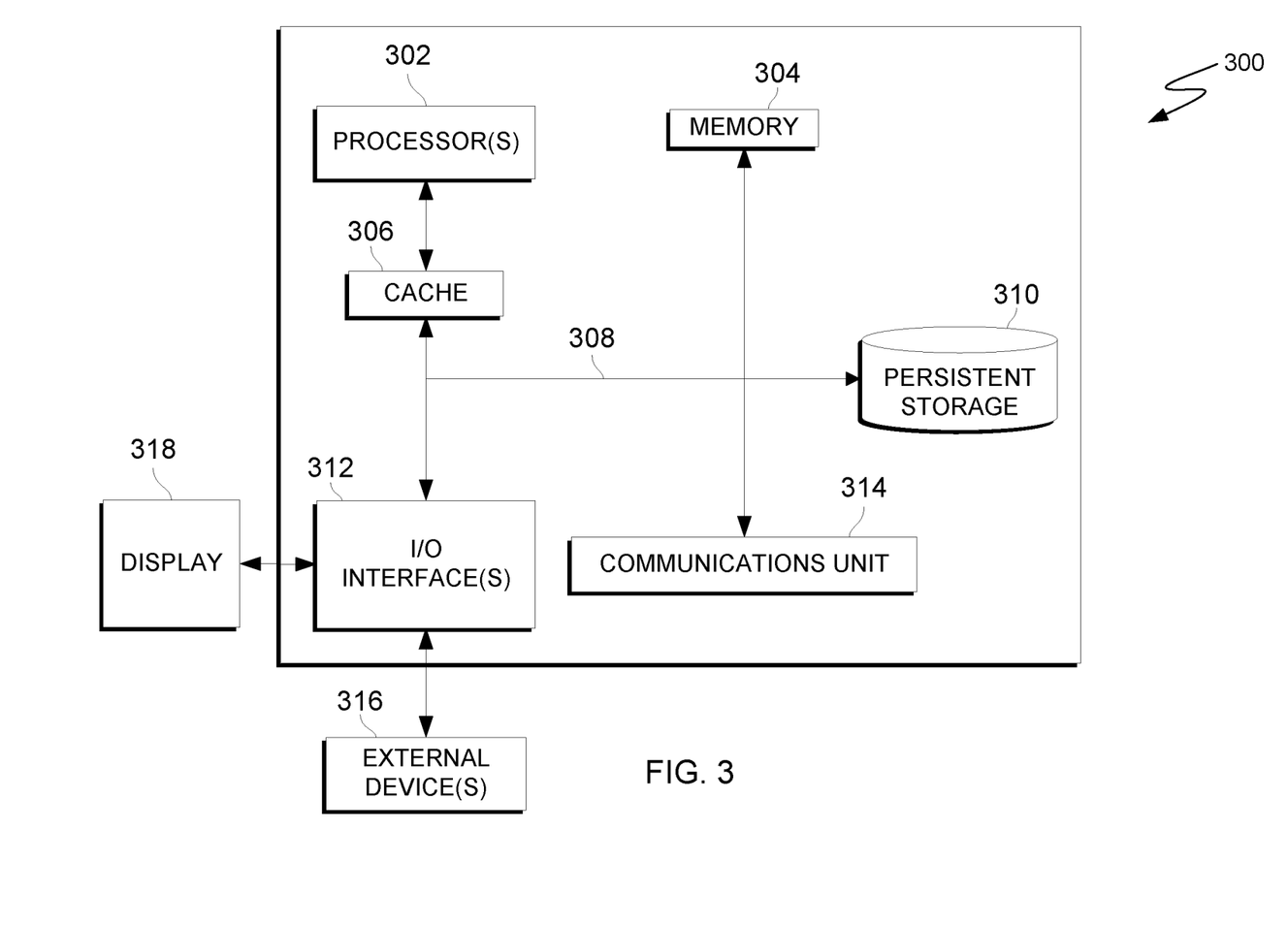
FIG. 3 is a block diagram of components of a computing device executing operations for dynamically constructing a knowledge base, in accordance with an embodiment of the present invention.

FIG. 3 is a block diagram of components of a computing device, generally designated 300, in accordance with an embodiment of the present invention. In one embodiment, computing device 300 is representative of client device 110. For example, FIG. 3 is a block diagram of client device 110 within computing environment 100 executing operations of client program 112.

It should be appreciated that FIG. 3 provides only an illustration of one implementation and does not imply any limitations with regard to the environments in which different embodiments may be implemented. Many modifications to the depicted environment may be made.

Computing device 300 includes communications fabric 308, which provides communications between computer processor(s) 302, memory 304, cache 306, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses.

Memory 304 and persistent storage 310 are computer-readable storage media. In this embodiment, memory 304 includes random access memory (RAM). In general, memory 304 can include any suitable volatile or non-volatile computer readable storage media. Cache 306 is a fast memory that enhances the performance of processors 302 by holding recently accessed data, and data near recently accessed data, from memory 304.

Program instructions and data used to practice embodiments of the present invention may be stored in persistent storage 310 and in memory 304 for execution by one or more of the respective processors 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer-readable storage medium that is also part of persistent storage 310.

Communications unit 314, in these examples, provides for communications with other data processing systems or devices, including resources of network 120. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computing device 300. For example, I/O interface 312 may provide a connection to external devices 316 such as a keyboard, keypad, a touch screen, and/or some other suitable input device. External devices 316 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 310 via I/O interface(s) 312. I/O interface(s) 312 also connect to a display 318.

Display 318 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
monitoring, by one or more processors, a user action in an application, wherein the user action comprises one or more user action sequences;
identifying, by one or more processors, a user access of an instructional information resource in one or more third party applications;
identifying, by one or more processors, completion of a common action sequence in the application, based, at least in part, on the one or more user action sequences;
associating, by one or more processors, the instructional information resource with the completion of the common action sequence; and
modifying, by one or more processors, a database of instructional information resources from third party applications, based on the association of the instructional information resource with the completion of the common action sequence.

2. The method of claim 1, further comprising:
determining, by one or more processors, whether the instructional information resource is above an access threshold, wherein the access threshold is based on a number of times the instructional information resource is accessed by a plurality of users in a predefined time.

3. The method of claim 2, wherein modifying the database of instructional information resources from third party applications includes at least one of (i) adding the instructional information resource when the instructional information resource exceeds the access threshold and (ii) deleting the instructional information resource when the instructional information resource is not accessed by the plurality of users for a predefined time period.

4. The method of claim 1, further comprising:
determining, by one or more processors, that a first user action sequence of the one or more user action sequences is a new action for an individual user.

5. The method of claim 3, wherein:
the instructional information resource is assigned a ranking, wherein the ranking is based on at least one of (i) a number of times the instructional information resource is accessed to complete a common action sequence and (ii) an efficiency of the instructional information resource; and
modifying the database of instructional information resources from third party applications further includes reorganizing the database based on the assigned ranking.

6. The method of claim 1, wherein instructional information resource comprises at least one of (i) a wiki, (ii) a forum, (iii) a blog entry, (iv) a subject matter expert website, and (v) a tutorial video.

7. The method of claim 1, further comprising:
constructing, by one or more processors, a help section of a software system, wherein the help section comprises the database of instructional information resources from third party applications; and
suggesting, by one or more processors, a first instructional information resource to a first user based on the database of instructional information resources from third party applications.

8. A computer program product, the computer program product comprising:
a computer readable storage medium and program instructions stored on the computer readable storage medium, the program instructions comprising:
program instructions to monitor a user action in an application, wherein the user action comprises one or more user action sequences;
program instructions to identify a user access of an instructional information resource in a one or more third party applications;
program instructions to identify completion of a common action sequence in the first application, based, at least in part, on the one or more user action sequences;
program instructions to associate the instructional information resource with the completion of the common action sequence; and
program instructions to modify a database of instructional information resources from third party applications, based on the association of the instructional information resource with the completion of the common action sequence.

9. The computer program product of claim 8, further comprising
program instructions to determine whether the instructional information resource is above an access threshold, wherein the access threshold is based on a number of times the instructional information resource is accessed by a plurality of users in a predefined time.

10. The computer program product of claim 9, wherein the program instructions to modify the database of instructional information resources from third party applications include at least one of (i) program instructions to adding the instructional information resource to the database when the instructional information resource exceeds the access threshold and (ii) program instructions to delete the instructional information resource from the database when the instructional information resource is not accessed by the plurality of users for a predefined time period.

11. The computer program product of claim 8, further comprising:
program instructions to determine that a first user action sequence of the one or more user action sequences is a new action for an individual user.

12. The computer program product of claim 10, wherein:
the instructional information resource is assigned a ranking, wherein the ranking is based on at least one of (i) a number of times the instructional information resource is accessed to complete a common action sequence and (ii) an efficiency of the instructional information resource; and
the program instructions to modify the database of instructional information resources from third party applications further include program instructions to reorganize the database based on the assigned ranking.

13. The computer program product of claim 8, wherein instructional information resource comprises at least one of (i) a wiki, (ii) a forum, (iii) a blog entry, (iv) a subject matter expert website, and (v) a tutorial video.

14. The computer program product of claim 8, further comprising:

program instructions to construct a help section of a software system, wherein the help section comprises the database; and program instructions to suggest a first instructional information resource to a first user based on the database.

15. A computer system, the computer system comprising:

one or more computer processors;

one or more computer readable storage media;

program instructions stored on the computer readable storage media for execution by at least one of the one or more processors, the program instructions comprising:

program instructions to monitor a user action in an application, wherein the user action comprises one or more user action sequences;

program instructions to identify a user access of an instructional information resource in a one or more third party applications;

program instructions to identify completion of a common action sequence in the first application, based, at least in part, on the one or more user action sequences;

program instructions to associate the instructional information resource with the completion of the common action sequence; and program instructions to modify a database of instructional information resources from third party applications, based on the association of the instructional information resource with the completion of the common action sequence.

16. The computer system of claim 15, further comprising program instructions to determine whether the instructional information resource is above an access threshold, wherein the access threshold is based on a number of times the instructional information resource is accessed by a plurality of users in a predefined time, and wherein the program instructions to modify the database of instructional information resources from third party applications include at least one of (i) program instructions to add the instructional information resource to the database when the instructional information resource exceeds the access threshold and (ii) program instructions to delete the instructional information resource from the database when the instructional information resource is not accessed by the plurality of users for a predefined time period.

17. The computer system of claim 15, further comprising:

program instructions to determine that a first user action sequence of the one or more user action sequences is a new action for an individual user.

18. The computer system of claim 16, wherein:

the instructional information resource is assigned a ranking, wherein the ranking is based on at least one of (i) a number of times the instructional information resource is accessed to complete a common action sequence and (ii) an efficiency of the instructional information resource; and the program instructions to modify the database of instructional information resources from third party applications further include program instructions to reorganize the database based on the assigned ranking.

19. The computer system of claim 15, wherein instructional information resource comprises at least one of (i) a wiki, (ii) a forum, (iii) a blog entry, (iv) a subject matter expert website, and (v) a tutorial video.

20. The computer system of claim 15, further comprising:

program instructions to construct a help section of a software system, wherein the help section comprises the database; and program instructions to suggest a first instructional information resource to a first user based on the database.

* * * * *